Sept. 1, 1970  R. FLINTH  3,526,287
SCALES HAVING A TRANSDUCER AND A PLATFORM MOUNTED
FOR LIMITED LATERAL MOVEMENT
Filed Feb. 13, 1968

INVENTOR.
RUNE FLINTH
BY
Jennings Bailey, Jr.

United States Patent Office 3,526,287
Patented Sept. 1, 1970

3,526,287
SCALES HAVING A TRANSDUCER AND A PLATFORM MOUNTED FOR LIMITED LATERAL MOVEMENT
Rune Flinth, Vasteras, Sweden, assignor to Allmanna Svenska Elektriska Aktiebolaget, Vasteras, Sweden, a corporation of Sweden
Filed Feb. 13, 1968, Ser. No. 705,139
Claims priority, application Sweden, Feb. 27, 1967, 2,654/67
Int. Cl. G01g 3/14
U.S. Cl. 177—211
3 Claims

ABSTRACT OF THE DISCLOSURE

A scale platform or load carrying member is supported on a transducer through metal plates between which is sandwiched a rubber plate to allow lateral movement. Stops are provided at the sides of the platform for limiting the lateral movement.

BACKGROUND OF THE INVENTION

Field of the invention

The invention relates to scales having force-sensitive transducers which support the load carrier.

The prior art

For scales of the platform type it is necessary to stabilise the load carrying part against sudden stresses in sidewise direction in order to protect the force sensitive transducers which support the load carrier. It is known to use resilient membranes or rods for this purpose but this is not a good solution since the membranes cause an unavoidable force between the load carrier and the base and thus have considerable influence on the measuring accuracy.

SUMMARY OF THE INVENTION

The present invention relates to an arrangement for scales, such as platform scales, container scales and the like, consisting of a load carrier and at least one force sensitive transducer, by which the above mentioned disadvantages are completely avoided. The invention is characterised in that the load carrier is supported by at least one journalling element consisting of at least two metal plates and plates of resilient material arranged between the metal plates and having great elasticity in the horizontal direction and that the scales has a number of stationary stops for limiting the sidewise movement of the load carrier when it is subject to lateral forces, which stops are arranged at such a distance from the load carrier that this is freely movable in the vertical direction when it is uninfluenced by lateral forces.

This means that when, for example, a vehicle drives onto the load carrier and thus exerts a force on it in a sidewise direction the load carrier will be moved sideways until it hits the stop. This movement is made possible by the elastic plate in the journalling element. The lateral forces which are transmitted to the transducer through the journalling element is completely harmless and can therefore not damage the indicator. When the vehicle has stopped on the load carrier and the lateral forces have ceased the load carrier returns to its original position where it is not in contact with any mechanical support or stop but is entirely free in the vertical direction and rests solely on the transducer. Weighing can then be carried out without any disturbances.

According to a further characteristic the transducer is in contact with a journalling element on at least one of its horizontal sides. This is so that if it proves necessary two journalling elements can be arranged one above the other and the transducer placed between them. This provides greater elasticity in sidewise direction and less mechanical stress on the transducer.

According to a third characteristic the transducer and journalling element are built together as a unit. This provides easier mounting when the scales are being constructed and also lower total height since certain mechanical parts of the transducer and journalling element may be common.

BRIEF DESCRIPTION OF THE DRAWINGS

In the accompanying drawing

DESCRIPTION OF THE PREFERRED EMBODIMENTS

Figure 1:
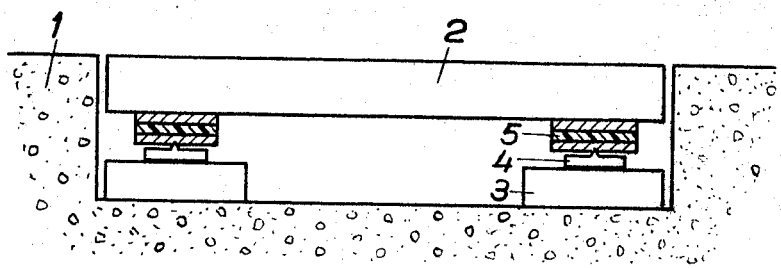
FIG. 1 shows a side view of a platform scales according to the invention.

The scales according to FIG. 1 comprises a load carrier 2 arranged in a base 1. The load carrier, which is usually rectangular, is supported at each corner by supports 3, a transducer 4 arranged on this and a journalling element 5 yielding in sidewise direction. The load carrier is sunk into the bases so that it is in substantially the same plane as the base and the edges of the base around the load carrier are made as stops for the load carrier. The distance between the load carrier and the edges of the base should be as small as possible so that the lateral forces arising on the transducer will be as small as possible and so that the transducer is not damaged. The size of the gap between the load carrier and the base is about 5–10 mm.

Figure 2:
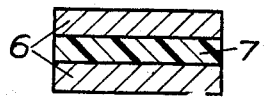
FIGS. 2 and 3 show how a journalling element may be designed.

According to FIG. 2 the journalling element 5 consists of two metal plates 6, preferably consisting of steel and a plate 7 of rubber or similar material situated between them. The rubber plate is rigidly vulcanized to the steel plates. The rubber plate is of such material and has such dimensions that its maximum compression in the load direction is negligible, of the order of magnitude 0.5 mm. In sidewise direction, however, it should have a considerably greater elasticity so that it permits lateral movement of one steel plate in relation to the other of about 5–10 mm.

Figure 3:
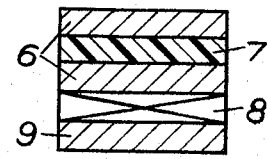

According to FIG. 3 the journalling element may be built together with a transducer 8 and a third steel plate 9 arranged below this to form a unit which can be placed directly on the support 3 in FIG. 1.

The embodiment shown in FIG. 1 is only one example to explain the inventive idea. It is of course possible to mount the scales on a flat floor with sloping edges arranged on the floor to facilitate driving up onto the load carrier and which then also provide stops to limit movement of the load carrier in sidewise direction.

In certain cases when there may be a risk that too great a load is placed on the load carrier it is suitable to arrange overload protection in the vertical direction so that the load carrier rests on the overload protection means when the load becomes so great that there is risk of the transducer being overloaded.

What is claimed is:

1. In scales comprising a load carrier and a plurality of spaced force sensitive transducer means positioned beneath the load carrier in which the load carrier is supported by journalling means one for each transducer means comprising at least two metal plates and a plate of resilient material arranged between the metal plates and having great elasticity in the horizontal direction supporting the load carrier, one of said plates being in forcetransmitting engagement with said transducer means and being rockable with respect thereto about a horizontal plane, the scales having a plurality of stationary stops for limiting lateral movement of the load carrier when it is subjected to lateral forces which stops are arranged at a distance from the load carrier whereby the load carrier is freely movable in the vertical direction when it is uninfluenced by lateral forces said transducer means and said journalling means forming the sole support of the load carrier.

2. Scales according to claim 1, characterized in that the transducer is in contact with the journalling element on at least one of its horizontal sides.

3. Scales according to claim 1, characterized in that the transducer and journalling element are built as one unit.

References Cited

UNITED STATES PATENTS

| | | | |
|---|---|---|---|
| 2,901,235 | 8/1959 | Bradley | 177—255 X |
| 3,299,976 | 1/1967 | Boadle et al. | 117—255 X |
| 3,306,384 | 2/1967 | Ross | 177—255 X |
| 3,123,166 | 3/1964 | Schellentrager | 177—211 |
| 3,176,508 | 4/1965 | Ward. | |
| 3,277,718 | 10/1966 | Ruge. | |
| 3,299,976 | 1/1967 | Boadle et al. | 177—211 |

RICHARD B. WILKINSON, Primary Examiner

G. H. MILLER, Jr., Assistant Examiner

U.S. Cl. X.R.

73—141; 177—255